United States Patent [19]

Winnemoller

[11] 3,996,093
[45] Dec. 7, 1976

[54] APPARATUS FOR PRODUCING TRANSVERSE WELD SEAMS IN A TWO-PLY WEB OF PLASTIC FILM

[75] Inventor: Aloys Winnemoller, Lengerich of Westphalia, Germany

[73] Assignee: Windmoller & Holscher, Lengerich of Westphalia, Germany

[22] Filed: June 4, 1975

[21] Appl. No.: 583,541

Related U.S. Application Data

[63] Continuation-in-part of Ser. No. 314,363, Dec. 12, 1972, abandoned.

[30] Foreign Application Priority Data

Dec. 17, 1971 Germany ............................ 2162789

[52] U.S. Cl. ............................ 156/358; 100/93 RP; 156/582; 156/583
[51] Int. Cl.² ........................................ B30B 15/34
[58] Field of Search .......... 156/515, 537, 553, 555, 156/582, 583, 358; 100/93 RP; 219/56

[56] References Cited

UNITED STATES PATENTS

| 2,202,670 | 5/1940 | Owen | 100/93 RP |
| 3,585,097 | 6/1971 | Beason | 156/583 |
| 3,703,590 | 11/1972 | Holler et al. | 156/583 |
| 3,844,091 | 10/1974 | Vedvik et al. | 156/583 |
| 3,855,025 | 12/1974 | Bosse | 156/583 |
| 3,901,754 | 8/1975 | Simpson et al. | 156/583 |

*Primary Examiner*—William A. Powell
*Assistant Examiner*—Jerome W. Massie
*Attorney, Agent, or Firm*—Fleit & Jacobson

[57] ABSTRACT

In an apparatus for producing transverse weld seams in a continuously fed two-ply web of plastics film and comprising a rotary welding cylinder about which the web is partially slung and which is provided with a plurality of welding bars at its periphery, the welding bars are steplessly adjustable radially of the cylinder, the smallest spacing between adjacent said transverse weld seams corresponds to twice the spacing between adjacent welding bars when the latter are in their retracted position, steplessly radially adjustable supporting members for the web are provided between the welding bars, and the welding bars are energizable by a sequence control in a sequence which is independent of the number of said welding bars.

8 Claims, 4 Drawing Figures

APPARATUS FOR PRODUCING TRANSVERSE WELD SEAMS IN A TWO-PLY WEB OF PLASTIC FILM

This application is a continuation-in-part of co-pending application Ser. No. 314,363, filed on Dec. 12, 1972, now abandoned.

The invention relates to an apparatus for producing transverse weld seams in a continuously fed two-ply web of plastics film, comprising a rotary welding cylinder about which the web is partially slung and which is provided with a plurality of welding bars at its periphery.

Prior U.S. Pat. No. 2,815,063 discloses such a welding cylinder in which six welding bars are provided at the periphery. The web to be welded is guided around the welding cylinder by three feed belts which are also slung about the cylinder and serve to drive the cylinder. The spacing between adjacent transverse seams in the web corresponds to the spacing between two adjacent welding bars at the cylinder periphery. An extremely large cylinder is required having a periphery measuring 6 times the smallest spacing between adjacent weld seams. Adjustment to larger seam spacings is effected by increasing the spacing between adjacent welding bars. For this purpose the distance between all the welding bars from the rotary axis of the cylinder is increased simultaneously by comparatively complex adjusting means consisting of a rigid frame in which the welding bars are mounted for radially outward movement together with screw spindles and bevel gears.

In this construction of welding cylinder, its diameter is considerably increased when the welding bars are set to a wide spacing. With correspondingly long screw spindles and their mountings, the cylinder is quite heavy and bulky and therefore has a comparatively high moment of inertia.

Further, as the cylinder diameter is increased, the feed belts that are passed about the cylinder and the web of plastics film extend along straight cords of the imaginary cylinder and consequently the periphery of the cylinder is in reality a regular hexagon instead of circular. The uniformly moving feed belts and the plastics web therefor tend to drive the welding cylinder irregularly. The resultant accelerating forces are likely to upset the positive engagement between the welding cylinder and the feed belts which also serve as drive belts for the cylinder and thus there is a danger of displacements taking place between the web and the welding bars. In most cases, however, the cylinder is unsuitable because of its large size because the cylinder diameter is always twice the largest spacing to be produced between adjacent weld seams.

German Patent Specification No. 2,004,944 discloses a welding cylinder having three transverse welding bars, in which a rectilinear path for the web between the welding bars is avoided by means of radially adjustable cylinder wall segments. The welding bars have a fixed radius but can be moved to and from an operative position. As a result, and because of the shape of the well segments, adjustments of the cylinder diameter is possible only within comparatively narrow limits. The smallest spacing between the transverse weld seams is again equal to the spacing between two welding bars. If this apparatus were to be constructed so that any desired spacing between consecutive weld seams may be selected, the equipment would again become bulky and in any case for larger radial adjustments of the wall segments there would again be a rectilinear course for the web between the peaks of each wall segment and the adjacent welding bars.

French Pat. Specification 1,551,880 discloses a welding cylinder similar to that of the aforementioned U.S. patent specification, in which an increase in the cylinder diameter is again possible by means of screw-threaded spindles for the purpose of setting any selectable weld seam spacing, the two-ply web being passed along a straight line between the individual welding bars. To increase the spacing between the weld seams, individual welding bars may be de-energised. The weld seam spacing can be automatically adjusted during operation of the apparatus. The basic disadvantages of the apparatus that have already been discussed in connection with the other prior specifications are also to be found in the apparatus of the French Specification.

The present invention aims to provide a transverse welding cylinder which is of minimum bulkiness, is adapted to produce weld seams at any desired spacing in a simple and reliable manner, and minimizes slip between the web to be welded and the means for effecting the welding.

According to the invention, an apparatus for producing transverse weld seams in a continuously fed two-ply web of plastics film comprises a rotary welding cylinder about which the web is partially slung and which is provided with a plurality of welding bars at its periphery, wherein a. the welding bars are steplessly adjustable radially of the cylinder
b. the smallest spacing between adjacent said transverse weld seams corresponds to twice the spacing between adjacent welding bars when the latter are in their retracted position
c. steplessly radially adjustable supporting members for the web are provided between the welding bars, and
d. the welding bars are energizable by a sequence control in a sequence which is independent of the number of said welding bars.

By selecting a number of welding bars so that the smallest desired spacing between adjacent weld seams is equal to twice the spacing between adjacent welding bars and by means of a sequence control that energises the welding bars in accordance with the desired seam spacing but independently of the sequence of the welding bars around the cylinder, an increase in the diameter of the cylinder of 1:2 can be dispensed with; instead, the maximum increase in diameter can be kept less than 1:1.5. This makes it possible to construct a stable and compact welding cylinder without sacrificing the possibility of obtaining large spacings between the weld seams because the maximum seal spacing can be even larger than the cylinder periphery. Further, since even with the smallest seam spacing there are disposed between the operative welding bars two correspondingly radially adjusted supporting members and one welding bar which is inoperative, the web will always be led about the cylinder in a path which very closely approximates a cylinder.

For sequence controlling the welding bars, a cam may be provided which rotates in sequence with the welding cylinder and which influences the sequence control through a number of micro-switches corresponding to the number of welding bars. This will ensure that the required welding bars are energized in the correct sequence independently of the cylinder speed.

The welding bars are peferably movable from an operative position, at which they make contact with the web, to an inoperative position, at which they are disengaged from the web. Those welding bars that are not required can therefore simply be moved to the inoperative position, this being desirable because the inoperative welding bars may still be hot. This would also make it possible to use permanently heated welding bars. For the purpose of moving the welding bars to and from their operative positions and also for pressing them onto the web, each welding bar may be provided with a co-rotating compressed air cylinder which is preferably equipped with a co-rotating control valve. Such compressed air cylinders with control valves facilitate rapid application of the welding bars to the web.

In a preferred embodiment of the invention, means for effecting radial adjustment of the welding bars and of the supporting members comprise two helical screws which are interconnected by a tube disposed centrally of the welding cylinder and which are engaged with a holding means for the welding bars and supporting members. Such a construction is stable and involves few moving parts, in contrast with known apparatus where separate adjusting screws or other adjusting means are provided for each weldng bar and for each supporting member. In the preferred construction according to the invention, adjustments of all the components at the periphery of the cylinder is very simply effected by turning the two interconnected helical screws relatively to the cylinder.

An example of the invention will now be described with reference to the accompanying diagrammatic drawings, wherein.

Figure 1:
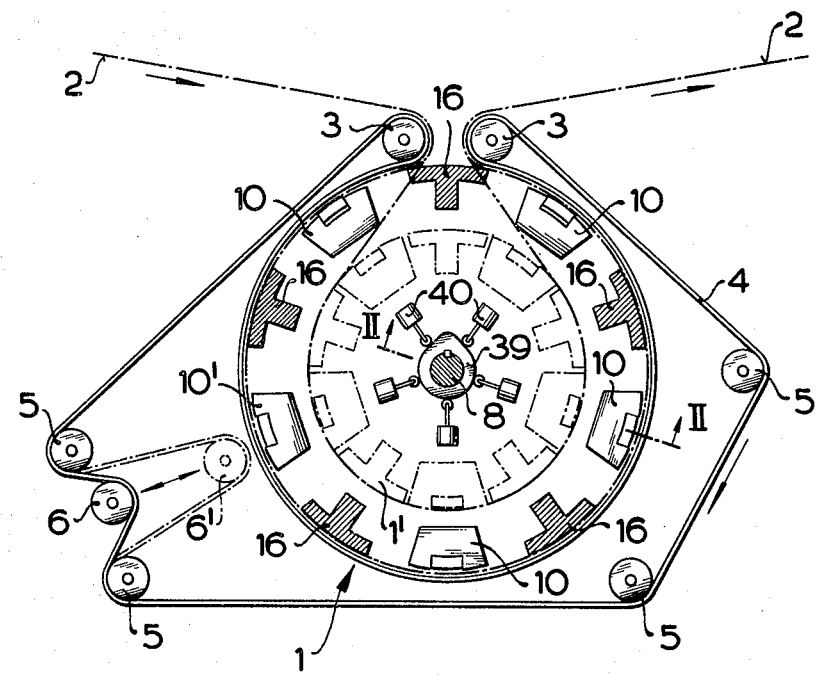
FIG. 1 is a side elevation of the welding apparatus.

The welding apparatus comprises a welding cylinder 1 about which a two-ply web 2 is partially slung to an extent determined by the position of two guide rollers 3 about which the web is passed. In its travel about the cylinder 1, the web 2 is pressed onto the cylinder by an endless belt 4. The inoperative or return run of the belt 4 passes about direction-changing rolls 3, 5 and 6. The roll 6 can be moved into the chain-dotted position 6' of FIG. 1 and serves as a tensioning roll so as to compensate for adjustments that are made to the cylinder diameter. The cylinder 1, guide rollers 3 and direction-changing rolls 5,6 are mounted on a frame (not shown) which also supports drive means for the cylinder.

The welding cylinder 1 comprises two brackets 7, 7' (FIG. 2) which are interconnected for rotation in unison by means of a shaft 8 to which they are secured by keys 9. Between the brackets 7, 7' there are five welding bars 10 which are uniformly distributed about the cylinder periphery and which can be simultaneously radially adjusted by displacing means 11,11'. Each displacing means comprise holding means 12, 12' to which the welding bar 10 is screw-connected. The holding means 12, 12' are each guided in a radial direction on a bevel gear 14, 14' by means of an associated helical screw 13, 13'. For lateral support of the holding means, the brackets 7, 7' are secured to guide bars 15. Supporting members 16 (FIG. 1) for reducing the gap between adjacent welding bars are connected to the bevel gears 14, 14' in a manner similar to that of the welding bars 10 so that, if the bevel gears 14, 14' are turned relatively to the brackets 7, 7', all the welding bars 10 and supporting members 16 will be simultaneously and uniformly adjusted along the helical screw 13, 13'. For this purpose the bevel gears 14, 14' are interconnected by a sleeve 17 on which they are mounted by keys 18 and they are mounted for rotation on the shaft 8 by means of roller bearings 19. The brackets 7, 7' carry pinions 20 which engage with the bevel gears 14, 14' and which are provided with a socket 21 for an adjusting tool such as a key. By turning one of the pinions 20, relative rotation will take place between the bevel gears 14, 14' and the brackets 7, 7', whereby the welding bars 10 and supporting members 16 will all be simultaneously radially adjusted. If radial adjustment is desired to be effected during operation of the apparatus with a view to altering the spacing between adjacent weld seams produced in the web, the helical screws could be adjusted by means of a servo motor which is electrically energised through slip rings. For this purpose the hub of one of the gears 14, 14' may be provided with spur gear teeth, in which case the bevel gearing and the pinions 20 can be dispensed with.

Figure 3:
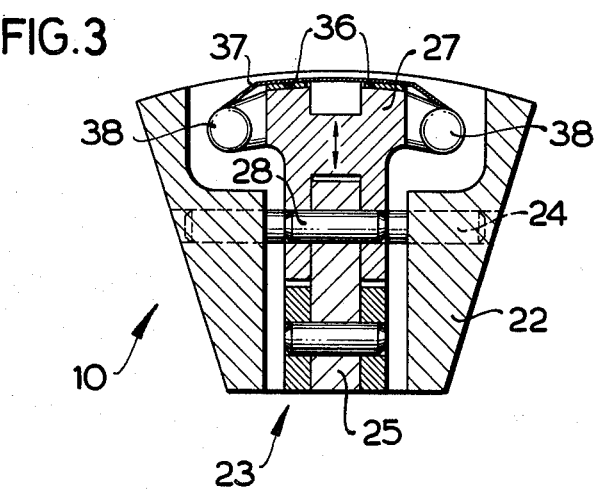
FIG. 3 is a section on the line III—III in FIG. 2, again with the welding bar in the inoperative. position.

Each welding bar 10 consists of a frame member 22 (FIGS. 2 and 3) in which a movable pressure member 23 is mounted by means of pins 24. Crank arms 25 and 26 are pivoted to the pins 24 and these crank arms are hinged to a welding beam 27 by pins 28. A connecting rod 29 between the two crank arms completes a parallelogram linkage so that, when the crank arms 25, 26 are rotated by means of a compressed air cylinder 30, uniform radial movement of the welding beam 27 takes place relatively to the frame member 22. The compressed air cylinder 30 is connected by conduits 31 to control a valve 32 on the outside of the bracket 7. Each of the five welding bars 10 is associated with a separate control valve 32. The supply of compressed air from the outside is effected through a common air conduit 33 for all the control valves. The supply of electrical energy takes place through leads 34 and slip rings. The supply of electrical energy to the welding beam 27 is analogously effected through slip rings and through leads 35. Heating elements 36 at the top of the welding beams 27 permit selective operation to provide a single weld seam or two juxtaposed weld seams. The surfaces of the heating elements 36, which are in strip form, are covered with a polytetrafluorethylene sheet 37 which prevent adhesion to the web 2 and which are passed about winding and tensioning rollers 38 provided on each welding beam 27.

Figure 2:
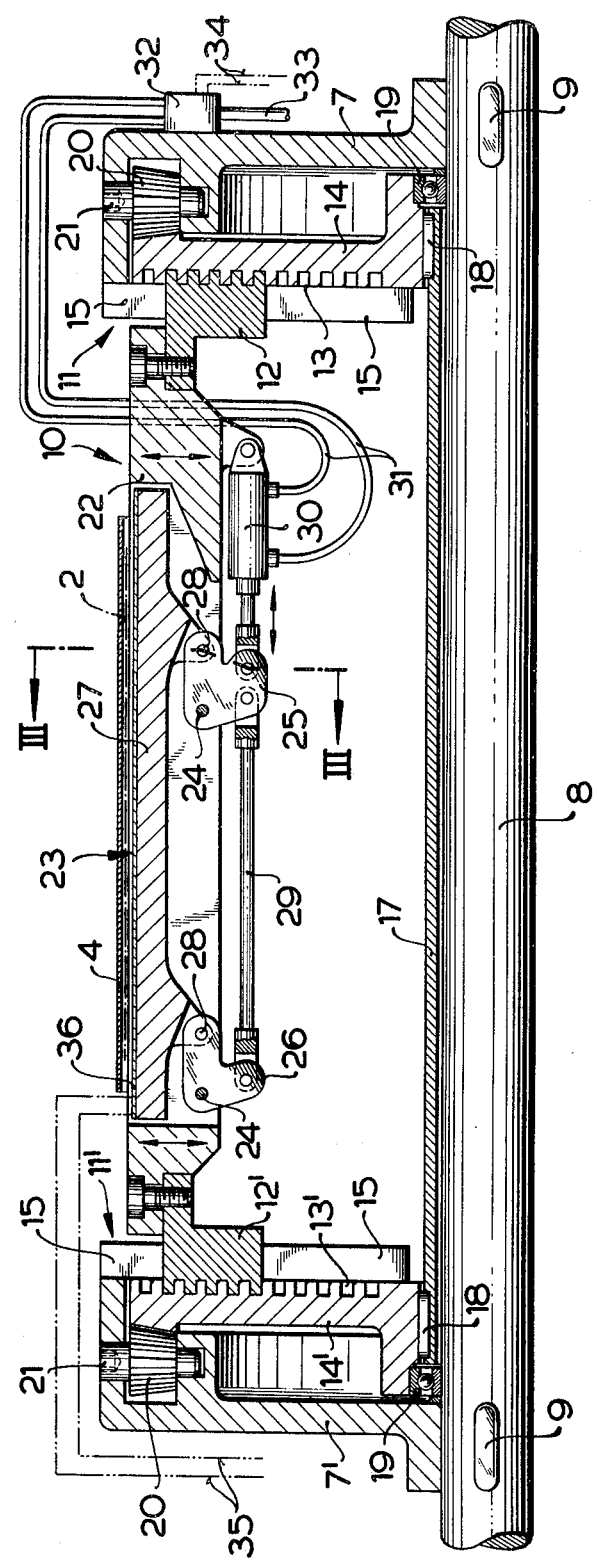
FIG. 2 is a section through one of the welding bars taken on the line II—II in FIG. 1 when the welding bar is in an inoperative position.

FIG. 1 indicates the range of adjustment that is possible for the welding cylinder 1. The smallest cylinder diameter is indicated where the welding bars 10 and supporting members 16 are shown in chain-dotted lines and, together, they form an almost continuous cylindrical surface. When the welding bars 10 and supporting members 16 are moved radially outwardly to define the largest possible cylinder diameter, gaps are formed between adjacent such radially movable parts and here the web 2 will bridge the gaps along straight lines. This will not, however, detrimentally influence guiding of the web 2 because the belt 4 follows the same path as the web 2 and presses the web into the welding bars 10. In any case, the gaps between the welding bars 10 and supporting members 16 are such that the web will still be fed along a substantially cylindrical path.

The illustrated construction is based on the concept of increasing the spacing between adjacent weld seams to a multiple of the cylinder periphery by making the appropriate welding bars 10 inoperative through electrical switching operations. The distance between adjacent weld seams will always be a whole number multiple of the set spacing between adjacent welding bars, the smallest seam spacing corresponding to twice the spacing between the adjacent welding bars. To adjust the seam spacing, a different control program can be selected for the welding bars that are to be energized or deenergized; however, this would result in progressive or stepped adjustment of the seam spacing. To permit stepless or continuous adjustment, the welding bar spacing must be adjusted instead of or in addition to choosing a different control programme, by radially adjusting the welding bars 10 and supporting members 16.

Depending on the seam spacings that are likely to be required in practice and the minimum welding cylinder diameter that is required to provide the longest possible welding time for each seam, it will generally be sufficient for only three control programmes to be provided for which either one, two or three welding bars are left inoperative.

Figure 4:
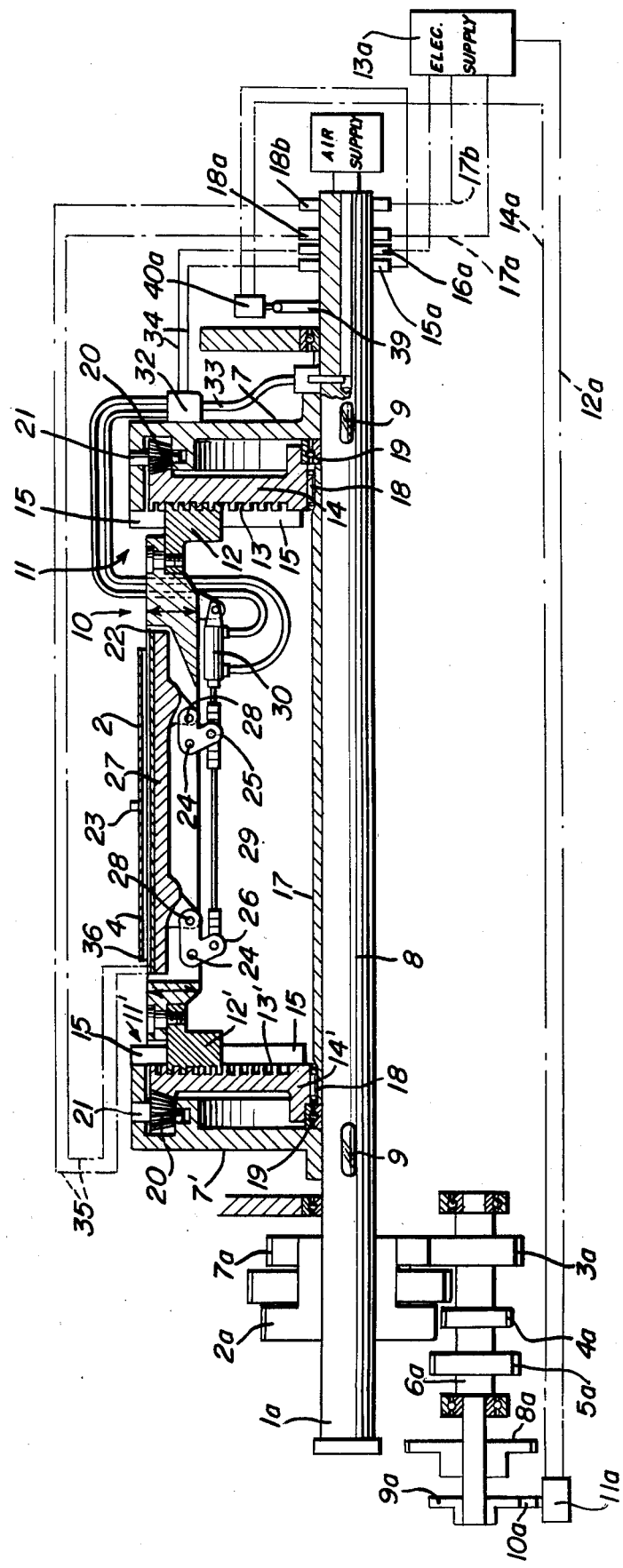
FIG. 4 shows the welding bar with the sequence control apparatus attached.

As will be seen from FIG. 4, the shaft 8 has been extended at both sides. The extension 1a carries gearing 2a which is fixed to rotate with the shafts but is longitudinally displaceable thereon. By means of such displacement, the gearing 2a is selectively engageable with one of the gears 3a, 4a or 5a which are keyed to a drive shaft 6a. In the illustrated position, the gear 3a is in mesh with the gear 7a of the gearing 2a. For this particular gear engagement, the transmission ratio is chosen so that for one complete revolution of the shaft 6a, the welding cylinder (FIG. 1) turns by two-fifths of its momentary circumference. Thus, the sequence control is dependent on the position of the cylinder itself rather than on either the speed of the cylinder or the particular location of the welding bars, and is thus independent of cylinder speed and sequential order of the welding bars on the cylinder. With a total of five equi-spaced welding bars around the periphery of the welding cylinder, this would mean that the spacing to be produced between adjacent transverse weld seams is equal to twice the spacing between adjacent welding bars. If the welding bars are in their fully radially retracted position, this would also give the smallest spacing that can be produced between adjacent transverse weld seams. Of course, it would be possible to select the transmission ratio so that the smallest spacing to be produced between adjacent weld seams is equal to the spacing between adjacent welding bars in their fully retracted position. However, the apparatus of the invention is intended for use in the manufacture of plastic bags. If one bears in mind that the bag lengths and consequently the seam spacings that are likely to be required in practice may vary from about 55 cm to 160 cm and that within this range the bag length or seam spacing is to be continuously adjustable by varying the cylinder circumference and/or by changing the transmission ratio by longitudinally displacing the gearing, it will be clear that by making the seam spacing exactly equal to the spacing between adjacent welding bars would result in a welding cylinder of considerably larger diameter than that according to the present invention.

If one should wish to reduce the size of the welding cylinder still further whilst retaining the feature of stepless (continuous) adjustability, the transmission ratio would have to be chosen so that the smallest spacing to be produced between adjacent weld seams is equal to three times the spacing between adjacent welding bars in the fully radially retracted position of the latter. This would be possible by appropriately constructing the gearing 2a and the gears 3a to 5a, although it is doubtful that sufficient space would then still be available to accommodate the mechanical components. For this reason, that is to say in order to obtain a cylinder that is as small as possible and in order nevertheless to have sufficient space available for accommodating the various components, the transmission ratio for the apparatus according to the present invention is selected so that the smallest seam spacing to be produced is equal to twice the spacing between adjacent welding bars (10) in their retracted position.

If, now, the shaft 6a has executed one complete revolution by way of a drive sprocket 8a and a motor (not shown) connected thereto by a chain (not shown), the cam 10a of the cam plate 9a operates the terminal switch 11a. Extending from this terminal switch 11a there is a conductor 12a leading directly to an electric control device 13a; and five conductors 14a, each leading to one of the five micro-switches 40. Only one of the micro-switches is visible in FIG. 4 and has been designated 40a. It is operated by the cam of the cam plate 39. A description of the functional relationship between the micro-switch 40a and its associated welding bar will be sufficient, it being understood that the other four micro-switches operate in an analogous manner. Since the switch 40a is switched on, current flows through the slip ring 16a to the control device 13a. The control valve is controlled through a time relay which is automatically deenergised after an accurately predetermined time equal to the welding period that is necessary for the particular plastics film material being welded. During this time the piston-cylinder unit 30 is supplied with air so that the permanently heated welding bar 10 is pushed radially outward against the material to be welded. The current supply for the welding bars is through the conductors 17a and 17b, the slip rings 18a and 18b and the conductors 35.

The full-line positions of the radially adjustable parts in FIG. 1 will produce the largest possible spacing between adjacent weld seams. The two welding bars 10 nearest the guide rollers 3 are energised and their welding beams (27 in FIG. 3) are pressed into the web 2. The other three welding bars 10 in FIG. 1 are de-energised and therefore inoperative, their welding beams being retracted. Before a previously energised welding bar 10 again reaches a welding position in relation to the web that is being fed onto the cylinder, this welding bar, as well as the two welding bars following immediately behind it, are switched off. After the web has made contact with three inoperative welding bars, a previously inoperative welding bar 10' is energised, reached the welding position and produces a weld seam.

In the illustrated construction with five welding bars, the cylinder will have returned to a starting position after five weld seams have been formed. With the illustrated largest size of four-fifths of the cylinder periphery, this corresponds to four complete cylinder revolutions. All the welding bars are re-energised at regular time intervals. The smallest size can be carried out with two-fifths of the cylinder periphery, all the bars 10 and members 16 of the cylinder then being in the chain-dotted line position of FIG. 1 for the smallest cylinder diameter. In this case, the operating cycle will then be repeated after every two complete cylinder revolutions, two welds being effected simultaneously in the operative region. The useful welding path is the same for all programs, namely almost four-fifths of the cylinder periphery, whereby good heat transmission is ensured between the heated welding bar and the web to be welded.

A cam disc 39 rotating together with the cylinder shaft 8 consecutively operates five micro-switches 40 during a complete cylinder revolution, the micro-switches being uniformly distributed about the cylinder periphery and mounted at a fixed position on the machine frame. As above discussed, the sequence control device is thereby notified of the cylinder position at any one time, the sequence control thereby being dependent on the cylinder position but independent of the cylinder speed. Adjustment to a new control program in which the weld seam spacing is only three-fifths or two-fifths instead of four-fifths of the cylinder periphery can very simply take place by actuating a manual switch on the sequence control device. This completely avoids operating mistakes such as those that could occur when replacing welding bars and all their electrical connections. Adjustment of the cylinder diameter can likewise be effected very simply by turning one of the pinions 21 with a key. This is carried out whilst the cylinder remains mounted in the machine frame, it only being necessary to adjust the tension of the belt 4 by means of the roller 6. As already mentioned, fully-automatic adjustment would be possibly by means of a servo motor and provision may be made to ensure that the desired weld seam spacing is adjusted steplessly.

What is claimed is:

1. In an apparatus for producing transverse weld seams in a continuously fed two-ply web of plastic film including a rotary welding cylinder about which the web is partially slung, the improvement which comprises:
   a plurality of welding bars movably mounted from a fully retracted to a fully extended position on said cylinder and defining the outer periphery of said cylinder,
   a means associated with said welding bars for adjusting said welding bars along respective radius of said cylinder from said fully retracted to said fully extended positions whereby in said fully extended position the radius of the welding cylinder is increased
   adjustable supporting members mounted on said cylinder between said welding bars for supporting said web, said supporting members including means for adjusting said supporting members along the radius of said cylinder and serving to partially guide said web around a processing path;
   means for sequentially energizing said welding bars in a sequence which is independent of the number of said welding bars; and
   said welding bars being spaced apart a distance whereby the spacing between adjacent welding bars when in the fully retracted position is equal to half the smallest desired spacing between adjacent transverse weld seams.

2. Apparatus according to claim 1 including a compressed air cylinder co-rotating and operatively associating with each welding bar for moving its respective welding bay along the radius of the welding cylinder, and for pressing it to the web.

3. Apparatus according to claim 2 including a control valve co-rotating with each compressed air cylinder for controlling the operation of the weld bars through their respective compressed air cylinder.

4. Apparatus according to claim 1 wherein said means for effecting radial adjustment of the welding bars and of the supporting members comprise helical screws which are interconnected by a tube disposed centrally of the welding cylinder and which are engaged with holding means for the welding bars and supporting members.

5. Apparatus for producing transverse weld seams in a continuously fed two-ply web of plastic film, with said transverse weld seams being spaced apart in the flowing direction by at least a predetermined minimum spacing, comprising:
   a rotary welding cylinder about which the web is partially slung;
   a plurality of welding bars movably mounted on said cylinder and defining an outer periphery of said cylinder;
   means associated with each of said welding bars for fully extending and fully retracting said welding bars whereby when in the fully extended position the radius of the welding cylinder is increased;
   a plurality of adjustable supporting members mounted on said cylinder between each welding bar, said supporting members including means for continuously adjusting each of said supporting members along the radius of said cylinder and serving partially to guide said web around a processing path; and
   means for sequentially energizing said welding bars in a sequence which is independent of the number of said welding bars;
   said welding bars being spaced apart so that the spacing between adjacent welding bars when in the fully radially retracted position is equal to half said minimum spacing.

6. Apparatus for applying seams to weld a continuously forward moving double layered plastic film belt, comprising:
   a welding cylinder;
   a plurality of radially retractable welding bars mounted on said cylinder, the distance between said welding bars in the retracted positions being equal to half the smallest distance between the seams to be produced;
   means associated with said welding bars for continuously retracting and extending said welding bars;
   a plurality of supporting bars mounted on said cylinder, respective of said supporting bars being mounted between adjacent welding bars, said supporting bars including means for continuously radially positioning said supporting bars; and
   sequence control means associated with said welding bars to actuate said welding bars in an order independent of their order around said cylinder.

7. The apparatus of claim 1 wherein said sequence control means controls said welding bars in accordance with the angular position of the cylinder with respect to the axis of rotation of said cylinder.

8. An apparatus for producing transverse weld seams in a continuously fed two-ply web of plastic film comprising a rotary welding cylinder about which the web is partially slung;

a plurality of welding bars movably mounted on said cylinder and defining the outer periphery of said cylinder;

means associated with said welding bars for steplessly adjusting said cylinder from a fully retracted to a fully extended position whereby in said fully extended position the radius of the welding cylinder is increased, the spacing between adjacent welding bars when in their fully radially retracted position being equal to half the smallest desired spacing between adjacent transverse weld seams;

radially adjustable supporting members mounted on said cylinder between said welding bars for supporting said web, said supporting members including means for steplessly adjusting said supporting members along the radius of said cylinder; and means for sequentially energizing said welding bars in a sequence which is independent of the number of said welding bars.

* * * * *